United States Patent

Falkner et al.

[11] Patent Number: 5,902,444
[45] Date of Patent: May 11, 1999

[54] FLOWABLE SILICONE PRODUCT AND PROCESS

[75] Inventors: D. Highly Falkner, Tempe; Tod S. Olsen, Chandler, both of Ariz.

[73] Assignee: American Bathtub Liners, Inc., Mesa, Ariz.

[21] Appl. No.: 08/774,687

[22] Filed: Dec. 24, 1996

[51] Int. Cl.⁶ ........................................ C09J 4/00
[52] U.S. Cl. ..................... 156/329; 528/901; 427/387; 156/329; 4/580
[58] Field of Search ............................ 528/901; 427/387; 156/329; 4/580

[56] References Cited

U.S. PATENT DOCUMENTS

| | | |
|---|---|---|
| 4,267,609 | 5/1981 | Altman et al. ............................. 4/580 |
| 4,360,631 | 11/1982 | Hahn . |
| 4,750,967 | 6/1988 | Kott et al. ............................. 156/499 |
| 5,108,791 | 4/1992 | Chung et al. . |
| 5,298,060 | 3/1994 | Harakal et al. . |
| 5,362,543 | 11/1994 | Nickerson . |
| 5,389,170 | 2/1995 | Brady et al. . |

OTHER PUBLICATIONS

Encyclopedia of Polymer Science and Engineering, vol. 15, Second Edition (1989) pp. 204–208, John Wiley & Sons, Inc.

*Primary Examiner*—Melvyn I. Marquis
*Attorney, Agent, or Firm*—Snell & Wilmer

[57] ABSTRACT

A flowable silicone product and process is disclosed which creates an impenetrable seal especially between a new bathtub liner and an old bathtub. The flowable silicone product has a short cure time and is injected into a channel which is formed around the perimeter of the top edge of the old bathtub.

22 Claims, 4 Drawing Sheets

FLOWABLE SILICONE PRODUCT AND PROCESS

The present invention relates generally to a flowable silicone product and a process for producing and applying that product in order to create an impenetrable seal between a new bathtub liner and an old bathtub. More particularly, the present invention relates to a flowable silicone product having a short cure time under normal conditions and a method for applying the flowable silicone product to form an impenetrable seal between an old bathtub and a new bathtub liner by injecting the flowable silicone product into a channel created by a U-ring comprised of rounded tape that is positioned about the top edges of the old bathtub prior to seating the new bathtub liner in place over the old bathtub.

DESCRIPTION OF THE PRIOR ART

The prior art discloses several flowable silicone compositions that are capable of bonding one substrate to another upon undergoing various curing processes depending upon the composition. For example, U.S. Pat. No. 4,360,631 issued to Hahn discloses a flowable, room temperature curable silicone composition that is particularly useful for sealing horizontally positioned joints such as highway joints. The composition primarily comprises a hydroxyl end blocked polydiorganosiloxane, a nonacidic, nonreinforcing filler, an aminoxysilicon compound as a cross-linking material, and methylvinyldisilane as a chain-extending material. This composition yields a flowable product which facilitates an efficient placement before cure, and further cures on exposure to moisture to a low modulus silicone elastomer that bonds to the surfaces it is applied to in order to yield a sealed waterproof joint. Although the Hahn patent discloses a flowable, room temperature curable silicone product which creates a waterproof seal, the Hahn reference does not disclose a method for applying this product to seal vertically positioned substrates.

U.S. Pat. No. 5,108,791 issued to Chung et al. describes a heat curable silicone composition having a rapid cure time. The curable composition includes a component having silicone-bonded hydrogen atoms, a component having silicon-bonded radicals that are reactive with the silicon-bonded hydrogen atoms, a curing catalyst, a catalyst-inhibitor and a bath life extender. This composition does not cure at room temperature for long periods of time and has a rapid cure time at elevated temperatures. When applied, the composition serves to render the surface of a solid substrate less adherent to materials that it would normally adhere to. This composition is disadvantageous with respect to the preferred application of the present invention, namely to form an impenetrable seal between the edges of two vertically positioned substrates and in particular between an old bathtub and a newly molded bathtub liner, in that it requires an additional element, namely heat, to cure the flowable silicone product.

Another example of a flowable silicone composition used for bonding materials is described in U.S. Pat. No. 5,389,170 issued to Brady et al. The curable adhesive composition disclosed in Brady et al. includes a silicone resin and a liquid silicone product. The composition is used in a method for bonding one substrate to another which includes the steps of heating one of a specified class of solventless moisture reactive organisiloxane compositions to a flowable state and allowing the composition to cure by exposing the bonded substrates to moisture. The strength of the bond between the substrates increases as the composition gradually converts from a thermoplastic material to a cured resin-reinforced elastomeric material that is not reflowable when heating to temperatures that are above the application temperature.

With respect to the preferred application of the present invention, namely forming an impenetrable seal between an old bathtub and a newly molded bathtub liner, U.S. Pat. No. 4,750,967 issued to Kott et al. is cited as an example of the prior art relating specifically to the preferred application. However, although the Kott et al. patent discloses the use of a filler material and sealing material to create an airtight seal about an evacuation tube which is used to vacuum mold the pliable bathtub liner material to the old bathtub, the Kott et al. patent reference does not disclose the use of a flowable silicone product to create an impenetrable seal between the vertical edges of the old bathtub and new bathtub liner where they meet side walls which surround the bathtub. Instead, Kott et al. describes using a molding or caulking compound to seal the groove adjacent the edge of the liner which abuts the interior wall.

Accordingly, there is a need for a process for providing a flowable silicone product having a short cure time and a simplified curing process wherein the flowable silicone product is capable of creating an impenetrable seal upon curing. Further, in that old bathtubs are currently being made to seem new again by the use of newly molded bathtub liners, there is a need for a method by which a new bathtub liner can be impenetrably sealed to an old bathtub thereby ensuring that the liner will not leak.

SUMMARY OF THE INVENTION

It is a principal object of the present invention to provide a flowable silicone product having a simple curing process and a rapid cure time.

It is a further object of the present invention to provide a simple method for making a flowable silicone product having a rapid cure time.

It is a further object of the present invention to provide a method for creating a silicone gasket with a flowable silicone material.

It is still a further object of the present invention to provide a method for creating an impenetrable seal between an existing bathtub and a new bathtub liner.

It is yet a further object of the present invention to provide a simple product and process for forming an impenetrable silicone gasket about the periphery of a new bathtub liner where it meets the walls which surround the existing bathtub.

It is yet a further object of the present invention to provide an easy process for securing a new bathtub liner to an existing bathtub which eliminates water from leaking between the liner and the existing bathtub.

In brief, the flowable silicone product includes a first component made of 100% silicone having a viscosity of oil and adding water to this component (0.5% to 1.5% by volume), and a second acetoxy base silicone component where the first and second components are combined in equal parts. The present invention is also directed toward a method for creating an impenetrable silicone seal comprising the steps of:

1) combining a 100% silicone component having a viscosity of oil and adding water to this component (0.5% to 1.5% by volume), 2) rapidly mixing the 100% silicone and water combination such that the water is evenly distributed throughout the 100% silicone;

3) combining the 100% silicone and water mixture with an equal part of an acetoxy base silicone;

4) thoroughly mixing the 100% silicone and water mixture with the acetoxy base silicone;

5) applying the resulting mixture to the area to be sealed; and 6) allowing the resulting mixture to cure.

The present invention is also directed toward a method having a particular application, namely a method for creating an impenetrable seal between an old bathtub and a new bathtub liner. A method for creating an impenetrable seal between an old bathtub and a new bathtub liner includes the steps of:

1) creating a defined channel between the old bathtub and the new bathtub liner wherein the defined channel has first and second closed ends and is capable of holding an injectable liquid; and 2) injecting a liquid sealant having rapid cure time into the channel thereby creating a closed channel.

The present invention also includes a more defined method for creating an impenetrable seal between an old bathtub, which is partially surrounded by walls, and a new bathtub liner that comprises the steps of:

1) applying a silicone primer to both the old bathtub and the underside and sides of the new bathtub liner;

2) applying a flat tape to the underside of the new bathtub liner;

3) applying a length of round tape about the perimeter of the shelf area of the old bathtub in the shape of a U-ring having first and second ends wherein the round tape is positioned within a range of approximately one-quarter inch to one-half inch from the walls surrounding the old bathtub and the ends of the round tape U-ring are in contact with the front edges of the walls at the front of the old bathtub thereby forming a channel having closed ends;

4) seating the new bathtub liner within the old bathtub;

5) injecting a flowable silicone having a rapid cure time into the channel thereby creating a sealed channel; and 6) applying a silicone caulk about the perimeter of the new bathtub liner after the flowable silicone has become tacky.

These and other objects, features and advantages of the present invention will become more apparent to those skilled in the art from the following, more detailed description of the preferred embodiments taken with reference to the accompanying drawings.

DETAILED DESCRIPTION OF THE PREFERRED EMBODIMENTS

The present invention provides a product and process for a flowable silicone wherein the flowable silicone is capable of creating an impenetrable seal. The present invention is particularly directed toward the application in which the flowable silicone is used to create an impenetrable seal between an old bathtub and a new bathtub liner.

Figure 1:
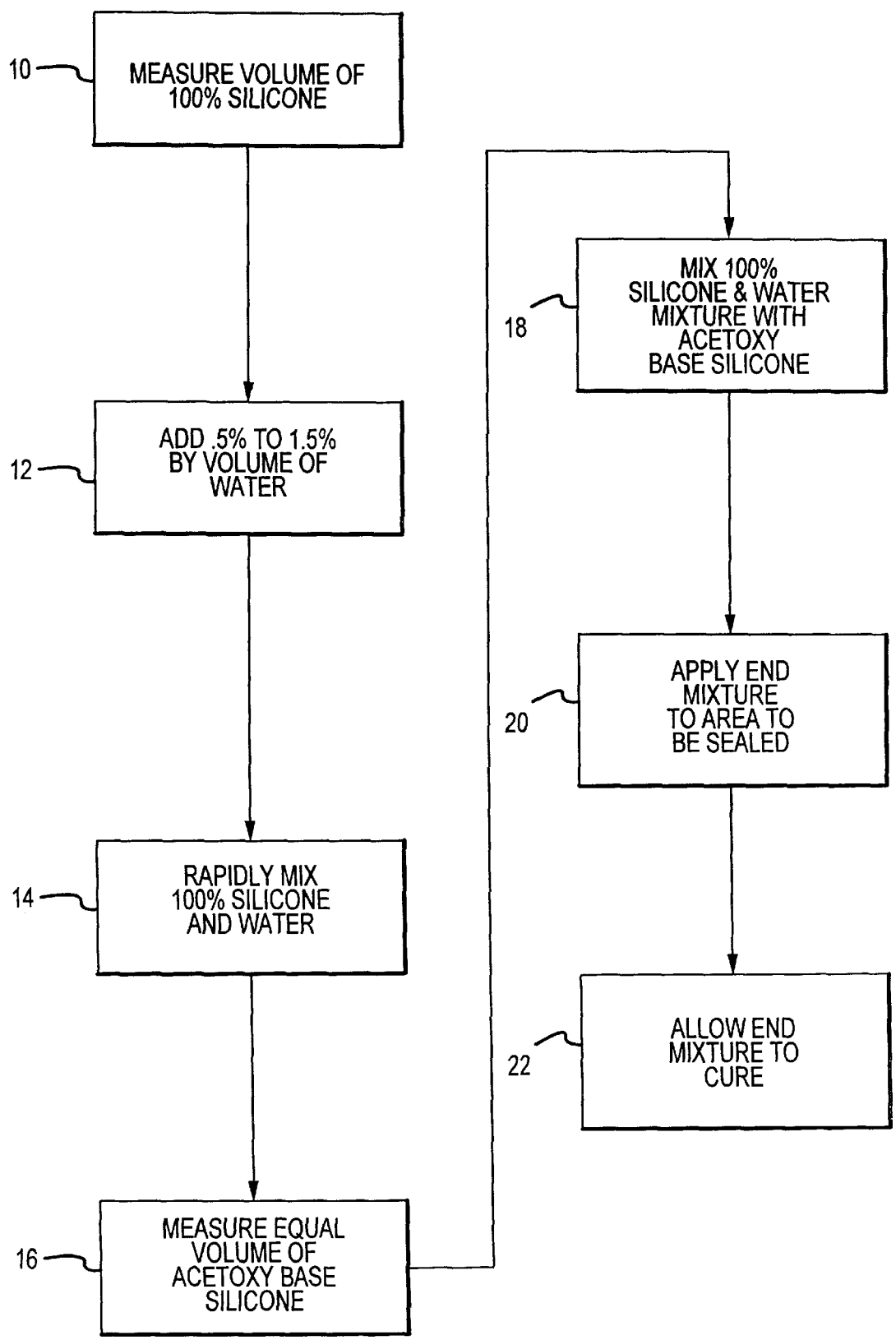
FIG. 1 is a flow chart which outlines the steps for creating the impenetrable silicone seal of the present invention.

Referring now to the figures, FIG. 1 illustrates a flow chart which outlines the steps for creating the impenetrable seal of the present invention. The first step 10 involves measuring a volume of 100% silicone. The 100% silicone product preferably comprises a viscosity of oil and is one of the products used in the manufacture of silicone such as Dow Corning 200 fluid which is used to thin out silicone product during its manufacture. Next, in step two 12, 0.5% to 1.5% water is added by volume to the 100% silicone element measured in step one 10. The addition of water in step two 12 allows the end mixture in the process to cure in a sealed environment over a short period of time. In other words, it helps to create a flowable silicone product having a rapid cure time.

In order to arrive at the appropriate percent volume of water for addition to the 100% silicone component, preliminary testing was performed in an environment which simulated one preferred application for the flowable silicone in which the flowable silicone is used to create an impenetrable seal between an old bathtub surrounded by shower walls and a new bathtub liner. The test conditions and experimental test results for arriving at the preferred percent water volume and appropriate volumes of the remaining components are discussed later in detail with reference to FIG. 6.

The 100% silicone product and water are rapidly mixed in step three 14 by shaking vigorously for approximately 15 to 20 seconds so that the water is evenly distributed throughout the 100% silicone. Next, in step four 16, a volume of acetoxy base silicone is measured to equal the volume of the 100% silicone. The acetoxy base silicone is preferably a silicone product similar to that known as Dow Corning 734 silicone. In step five 18, the 100% silicone and water mixture is combined and blended with the acetoxy base silicone by using an electric drill and a small stirring attachment. The combination can be easily mixed within a squeeze bottle containing the acetoxy base silicone and enough additional space to accommodate the addition of the 100% silicone and water mixture, after the 100% silicone and water mixture is added to the squeeze bottle.

The resulting end mixture is applied to the area to be sealed in step six 20 and in the final step, step seven 22, the end mixture is allowed to set for a period of time in order to cure. The use of equal parts of the 100% silicone and acetoxy base silicone along with the addition of 0.5% to 1.5% water by volume to the 100% silicone results in a flowable silicone product having a rapid cure time.

Figure 6:
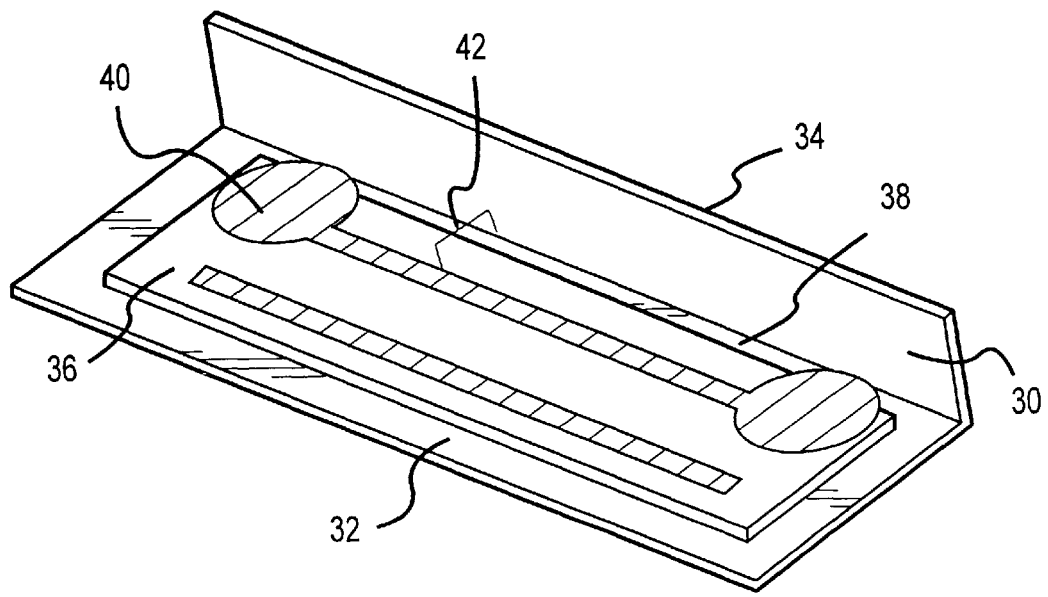
FIG. 6 is a perspective view of the test piece which was used to simulate a bathtub with a surrounding shower wall and a new bathtub liner in order to perform experimental tests for obtaining the preferred embodiment of the flowable silicone product of the present invention.

Turning now to FIG. 6, there is shown a perspective view of the test piece which was used to simulate a bathtub with a surrounding shower wall and a new bathtub liner in order to perform experimental tests for obtaining the preferred embodiment of the flowable silicone product of the present invention.

A sample of plastic material 30 similar to the material which comprises new bathtub liners was formed with a two inch 90 degree bend in order to simulate a bathtub 32 and its surrounding shower wall 34. Next, strips of clear ¼ inch acrylic material 36 were cut to simulate a new bathtub liner. The clear acrylic material 36 was placed so that there was a ⅛ inch gap 38 between the clear acrylic material 36 and the simulated shower wall 34. Butyl tape was then positioned on top of the clear acrylic material 36 and used as a gasket 40 to create a sealed channel 42 between the clear acrylic material (the simulated bathtub liner) 36 and the plastic material 30 with the 90 degree bend (the simulated bathtub 32 and shower wall 34).

The ⅛ inch gap is the average gap size used in actual installations of new bathtub liners over old bathtubs. The clear acrylic material 36 allows the liquid caulking to be observed as it flows into the sealed channel 42. As a starting point, two different liquid caulking products currently available on the market were tested—PHENOSEAL® liquid caulk manufactured by Gloucester company and Dow Corning 734, a liquid sealant manufactured by Dow Corning. The products were tested by injecting them into the sealed channel 42 shown in FIG. 6.

The PHENOSEAL® liquid caulking flowed into the sealed channel 42 and filled all the voids. However, the PHENOSEAL® took several days to reach full cure within the sealed environment and after pulling the test pieces apart (i.e. the simulated liner 36 and the simulated bathtub 32 and shower wall 34), adhesion appeared to be good but not as strong as one would typically get with 100% silicone. The Dow Corning 734 flowable sealant is a 100% silicone rubber that claims to be self leveling with all the advantages of silicone. The Dow Corning 734 was a heavier consistency than the PHENOSEAL® liquid caulking and did not flow into the sealed channel as easily as the PHENOSEAL®. However, full cure was achieved with the Dow Corning 734 in only seventy-two hours and the adhesion was excellent. Still, in that most circumstances require a new bathtub liner to be installed and ready for use within a day, a flowable silicone product was needed having a faster cure time.

In that the humidity in the air is what causes an acetoxy base silicone to cure, it was hypothesized that adding a small amount of water to the silicone would speed up the cure time while still creating a seal having excellent adhesion. However, the creation and packaging of such a product also presented an obstacle in that if the appropriate portion of water was added, the flowable silicone product would cure within the packaging before it could even be applied. As a result, it was conceived that one could mix an acetoxy base silicone product (the Dow Corning 734 product) with a combination of fluid silicone (the Dow Corning 200 fluid) and water immediately before injecting the silicone product to arrive at a flowable silicone product having a rapid cure time and excellent adhesion. To that end, the following table shows the results of the testing which was performed in order to determine the proper concentration of water to be added to the fluid silicone:

TABLE 1

Results After Injecting Flowable Silicone Product of the Present Invention at a Room Temperature of Approximately 80° F.

| Water (% by volume of 100% silicone) | Skin Time (Minutes) | Tack Free Time (Minutes) | Full Cure Time (Hours) | Working Time (Minutes) |
|---|---|---|---|---|
| 0 | 15 | 45–50 | approx. 72 | |
| .50 | 15 | 40 | under 24 | |
| .75 | 5–8 | 30–35 | under 12 | up to 5 |
| 1.0 | 5–8 | 25–30 | under 10 | up to 5 |
| 1.5 | 5 | 20 | under 6 | less than 3 |

Note that equal parts of 100% silicone fluid (Dow Corning 200 fluid) and acetoxy base silicone (Dow Corning 734 silicone) were used and that the water percentage by volume was added to the Dow 100% silicone fluid prior to the 100% silicone and water mixture being added to the acetoxy base silicone.

The skin time refers to the amount of time which passes before a solid film is produced on the liquid surface of the flowable silicone. The tack free time is the point at which a bead of gun grade caulking can be applied on top of the sealed joint for aesthetic purposes without forcing the flowable silicone out of the sealed channel. The cure time refers to the time required for the flowable silicone to fully set thereby creating an impenetrable seal.

The test results shown in Table 1 are for an average of several tests performed. Each test run provided slightly different results in that the product is very sensitive to temperature and humidity. The 0.75% to 1.5% water added by volume to the silicone fluid (Dow Corning 200 fluid) results in an adequate working time and an acceptable tack free time for the specific application of creating an impenetrable seal between an old bathtub and new bathtub liner. Nevertheless, although the preferred composition of the flowable silicone product includes 0.75% to 1.5% water by volume of the silicone fluid, it should be understood that a wider range of water volume can still be used to produce a flowable silicone for creating an impenetrable seal with the exception that water volume percentages less than 0.75% will result in longer tack free times and cure periods.

The test results show that the cure time of the flowable silicone can be controlled by adding a small percentage of water to the silicone fluid. Slower cure times in colder temperatures are compensated for by increasing the volume percentage of water added to the silicone fluid (Dow Corning 200 fluid). The percentage of water added to the silicone fluid is approximately 1% by volume during the winter months and approximately 0.75% by volume during the summer months.

Figure 2:
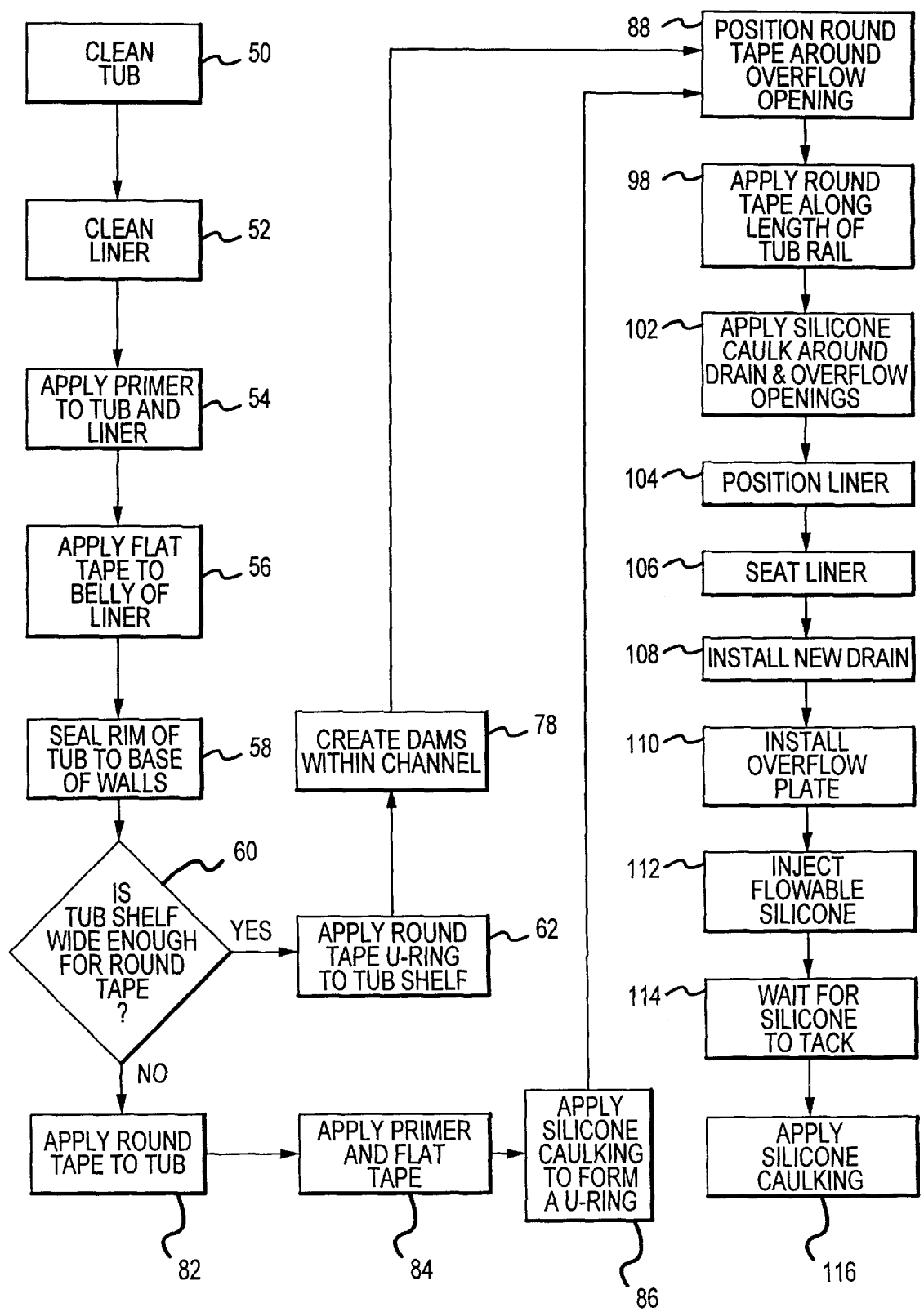
FIG. 2 is a flow chart which outlines the steps for creating an impenetrable seal of the present invention between an old bathtub partially surrounded by walls and a new bathtub liner.

FIG. 2 shows a flow chart which outlines the steps for creating an impenetrable seal of the present invention between an old bathtub partially surrounded by walls and a new bathtub liner. In step one 50, the old bathtub is thoroughly cleaned with acetone to enable the adhesives to maintain proper contact with the bathtub. All soap films, water deposits, etc. should be removed from the old bathtub. Next, the new bathtub liner is thoroughly cleaned in step two 52. Diluted denatured alcohol (DNA) comprising a concentration of 50% DNA and 50% water is used to clean the front, acrylic side of the new bathtub liner and full strength DNA is used to clean off dirt, packaging tape residue, etc. from the back side of the new bathtub liner.

Primer is applied to the old bathtub and new bathtub liner in step three 54. Silicone primer is applied to the entire shelf area of the bathtub and to the bottom inch of the walls surrounding the old bathtub. Silicone primer is also applied to the entire shelf area of the new bathtub liner and to the edges of the liner where silicone caulking will be applied. A black polymer primer is applied to 1) the old bathtub overflow area starting about one inch away from the overflow opening and extending out approximately six inches from the overflow opening, 2) the liner overflow area to match the areas primed on the old bathtub, 3) the entire belly of the liner such that it extends past the edge of the non-slip pattern but away from the drain area, and 4) any areas on both the bathtub and liner where tape will be used to hold the skirt of the liner to the bathtub.

Step four 56 involves the application of flat two-sided tape to the belly of the liner. The flat tape is placed parallel to the sides of the liner on the belly of the liner from the front of the liner to the back of the liner. Typically, eight to nine rows of tape positioned approximately one to one and one-half inches apart will be required to cover the liner belly. The flat tape should be positioned such that it extends beyond the slip resistant grate. At least two layers of flat tape should be applied around the perimeter of the liner belly (around the edges of the non-slip grate). If possible, it is preferable to double tape the entire belly of the liner. Next, the base of the walls surrounding the old bathtub are sealed with silicone to the rim of the old bathtub in step five 58 to form a silicone seal 59 (See FIG. 3) around the base of the walls.

Figure 3:
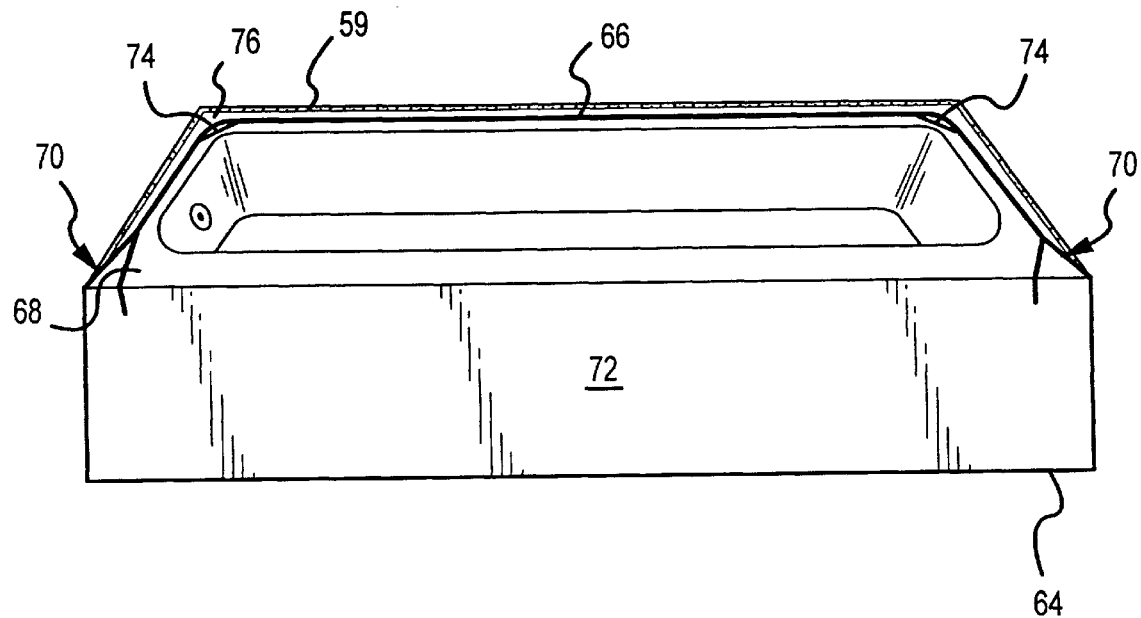
FIG. 3 is a perspective view of an old bathtub having a round tape U-ring positioned along a portion of the bathtub's shelf prior to seating a new liner within the old bathtub thereby creating a closed end channel for injecting the flowable silicone of the present invention.

In step six 60, one must determine whether the old bathtub shelf is wide enough to position round tape approximately ¼ inch from the walls surrounding the old bathtub. If the bathtub shelf is wide enough, a round tape U-ring is applied to the bathtub shelf in step seven 62. FIG. 3 shows a perspective view of an old bathtub 64 having a round tape U-ring 66 positioned along the old bathtub's shelf 68 prior to seating a new liner within the old bathtub 64. The round tape should be installed approximately ¼ inch from the walls surrounding the old bathtub and should come into contact with the walls for a length of approximately 1½ to 2 inches near the front ends 70 of the walls adjacent the skirt 72 of the old bathtub 64. At these front ends 70, the round tape can be coiled approximately three times and then pressed against the walls adjacent to the skirt 72, and at the edges of, the old bathtub 64.

Depending upon the distance between the liner shelf and the tub shelf, the round tape may need to be doubled in thickness. To double the thickness of the round tape, a second length of round tape is placed on the bathtub and pressed against the first length of round tape to form a double seal. An additional length of round tape may also be positioned on top of, and centered between, the double round tape U-ring thereby doubling the thickness of the round tape U-ring. Next, in the two corners where the plumbing wall and back wall meet the soap dish wall, an additional length of round tape is positioned diagonally so that the ends of this additional round tape are sealed to the U-ring. These two diagonal round tape pieces 74 function to provide additional support.

The round tape 66 will create a sealed channel 76 which will hold the flowable silicone sealant described with reference to FIG. 1. In order to accomplish this, the round tape 66 must be sealed to the walls, bathtub, and new bathtub liner once the liner is installed. In the next step, step eight 78, a plurality of dams 80 (See FIG. 4) are positioned within the channel 76 to seal off sections of the channel 76. To construct the plurality of dams 80, a small amount of silicone caulking is positioned between the round tape U-ring 66 and the walls surrounding the old bathtub. The silicone caulking should be the same height as the round tape U-ring 66. The plurality of sections within the channel 76 created by the plurality of dams 80 prevent the flowable silicone from flowing to one side of the bathtub if the bathtub is not level.

Figure 4:
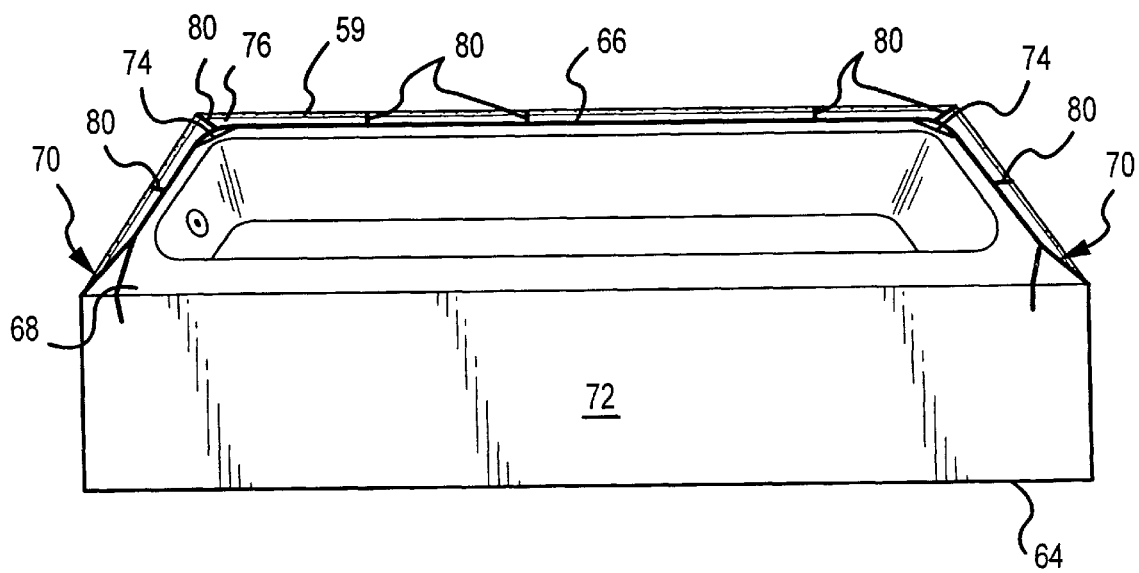
FIG. 4 is a perspective view of an old bathtub having a closed end channel on the bathtub's shelf for injecting the flowable silicone of the present invention wherein the closed end channel includes a plurality of dams or barriers which divide the closed end channel into a plurality of sections.

After installing the liner, the flowable silicone described in accordance with FIG. 1 will be injected into the sections of the channel 76 created by the round tape 66 and plurality of dams 80. The flowable silicone will run down into the old bathtub and not fill up the channel if the liner is not properly seated on the gasket formed by the round tape U-ring. This may be caused by improper installation of the bathtub liner (being cut too tight therefore binding on the surrounding shower walls and not allowing it to seat on the round tape properly), by improper installation of the round tape U-ring, or by attempting to install the wrong style of bathtub liner. If this happens the liner must be reinstalled. This ensures a proper water tight installation and allows the installer to know without doubt that the bathtub liner has been installed properly. FIG. 4 shows a perspective view of the old bathtub 64 having a closed end channel 76 on the bathtub's shelf 68 for injecting the flowable silicone of the present invention wherein the closed end channel 76 includes the plurality of dams 80 which divide the closed end channel 76 into a plurality of sections.

If the tub shelf 68 is not wide enough to position the round tape ¼ inches from the walls surrounding the bathtub thereby creating a ¼ inch channel with the round tape 66, the bathtub liner must be installed using a silicone U-ring. If this is the case, round tape is applied to the old bathtub in step nine 82 by positioning a length of round tape ¼ inch to ½ inches away from the wall on top of the bathtub shelf even if the round tape must be placed on the radius of the tub shelf. The round tape will create a channel which will hold the silicone in place. Next, in step ten 84, black primer and flat tape are applied in horizontal strips along the soap dish wall of the bathtub starting about three inches below the tub shelf. This black primer and flat tape will hold the liner in position while the silicone U-ring cures. Then, in step eleven 86, a heavy bead of silicone caulking is applied on the tub shelf along the base of all three walls that surround the bathtub. The caulk bead should be approximately ½ inch in height.

Figure 5:
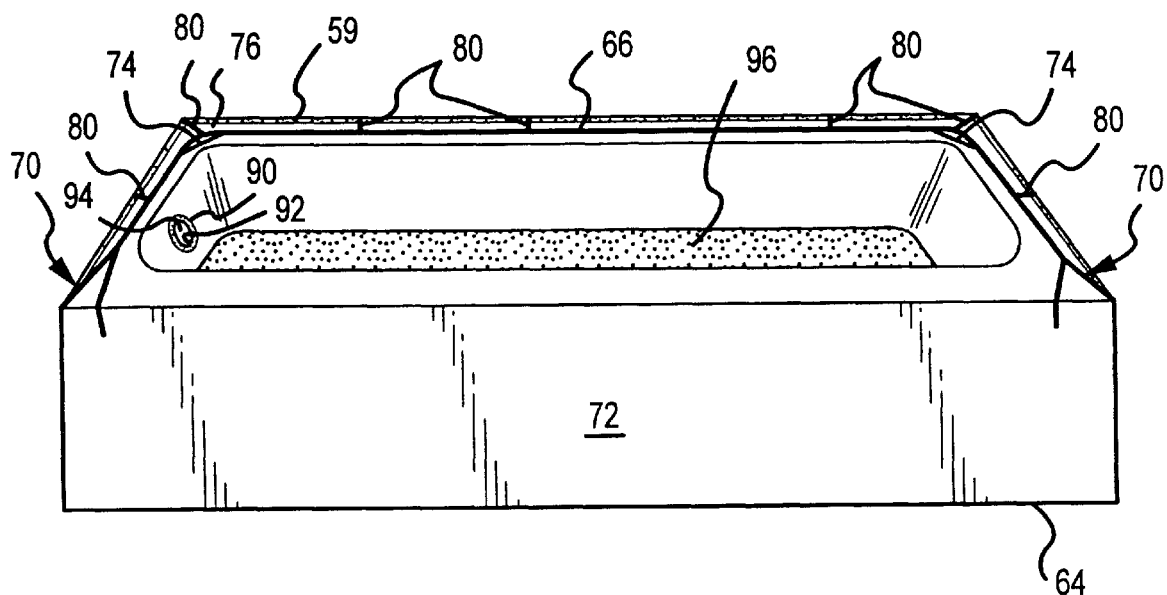
FIG. 5 is a perspective view of the old bathtub shown in FIG. 4 after placement of the butyl tape gaskets, the silicone seal around the overflow, and the butyl adhesive on the belly prior to seating a new bathtub liner within the old bathtub.

Next, regardless of whether a round tape U-ring or silicone U-ring is used, round tape is positioned about the overflow opening in the bathtub in step twelve 88. FIG. 5 illustrates a perspective view of the old bathtub shown in FIG. 4 after placement of the butyl tape gaskets, placement of the round tape 90 and silicone seal 92 around the overflow 94, and placement of the butyl adhesive on the belly 96 prior to seating a new liner within the old bathtub.

In step thirteen 98, a length of round tape 100 is placed on the rail of the bathtub such that it makes contact with the round tape U-ring 66. Heavy beads of silicone caulk are then applied around the drain opening and the overflow opening of the bathtub in step fourteen 102. A silicone primer should be used before applying the silicone caulk. Next, the liner is positioned in step fifteen 104 and seated in step sixteen 106. The new drain and overflow plate are installed in step seventeen 108 and step eighteen 110, respectively.

Next, the flowable silicone made in accordance with the method described in detail with reference to FIG. 1 is injected into the sections of the channel 76 that was created by the round tape U-ring 66 in step nineteen 112 or the silicone U-ring in step eleven 86. The flowable silicone will completely fill the void between the liner and the tub thereby creating a seal which will never allow water to get in between the liner and the bathtub. Next, in step twenty 114, the flowable silicone is allowed to set for approximately fifteen to twenty minutes, or a bit longer if possible, until it becomes tacky. Finally, in step twenty-one 116, the perimeter of the liner is caulked with silicone caulking. A finger should be used to force the caulking into the seam so that there is good adhesion to the walls and liner.

While preferred embodiments of the invention have been shown and described, it will be apparent to those skilled in this art that various modifications may be made in these embodiments without departing from the spirit of the present invention. Therefore, all suitable modifications and equivalents fall within the scope of the invention.

We claim:

1. A flowable silicon product having a cure time under twenty-four hours comprising:
    a) a first component comprising a 100% silicone fluid, and water within a range of 0.5% to 1.5% by volume, and
    b) a second component comprising an acetoxy based flowable silicone wherein said first component and said second component are evenly blended with one another to form the flowable silicon product.

2. The flowable silicon product of claim 1 wherein said product comprises equal parts by volume of said 100% silicone fluid and said acetoxy based flowable silicone.

3. A flowable silicon product having a cure time under twenty-four hours which forms an impenetrable gasket about the circumference of a bathtub and bathtub liner comprising:
    a) a first component comprising a 100% silicone fluid, and water within a range of 0.5% to 1.5% by volume; and
    b) a second component comprising an acetoxy based flowable silicone wherein said first component and said second component comprise equal parts by volume and are evenly blended with one another to form the flowable silicon product.

4. A method for creating an impenetrable silicone seal comprising the steps of:
    a) combining a volume of 100% silicone fluid, with water in a range of 0.5% to 1.5% by volume;
    b) rapidly mixing said volume of 100% silicone fluid and water such that the water is evenly distributed throughout the 100% di-methyl silicone fluid;
    c) combining said 100% silicone fluid and water mixture with a volume of an acetoxy based flowable silicone that is equal to said volume of 100% silicone fluid;
    d) thoroughly mixing said 100% silicone fluid and water mixture with the acetoxy based flowable silicone;
    e) applying the resulting mixture to an area to be sealed; and
    f) allowing said resulting mixture to cure.

5. The method of claim 4 for creating an impenetrable silicone seal further comprising the steps of:
    allowing the resulting mixture to set for a time within the range of approximately 20 to 35 minutes until the resulting mixture becomes tacky; and
    applying a silicone caulking over the resulting mixture wherein said steps of allowing the resulting mixture to set and applying a silicone caulking follow said step of applying the resulting mixture to an area to be sealed.

6. A method for creating an impenetrable and water tight seal between an old bathtub and a new bathtub liner comprising the steps of:
    a) creating a defined channel between said old bathtub and said new bathtub liner wherein said defined channel has first and second closed ends and is capable of holding an injectable liquid; and
    b) injecting a liquid sealant having a cure time under twenty-four hours into the channel, thereby creating a closed channel.

7. The method of claim 6 wherein said step of creating a defined channel comprises the step of applying a material capable of forming a gasket about a perimeter of a shelf area of the old bathtub in the shape of a U-ring having first and second ends wherein said gasket material is positioned within available space on a shelf of the bathtub extending from a plurality of walls surrounding the old bathtub and the ends of said U-ring gasket are in contact with front edges of the walls at a front of the old bathtub, thereby forming a channel having closed ends.

8. A method for creating an impenetrable seal between an old bathtub partially surrounded by walls and a new bathtub liner comprising the steps of:
    a) applying a silicone primer to both the old bathtub and underside and sides of the new bathtub liner;
    b) applying a flat tape to the underside of the new bathtub liner;
    c) applying a material capable of forming a gasket about a perimeter of a shelf area of the old bathtub in the shape of a U-ring having first and second ends wherein said gasket material is positioned within available space on a shelf of the bathtub extending from a plurality of walls surrounding the old bathtub and the ends of said U-ring gasket are in contact with front edges of the walls at a front of the old bathtub, thereby forming a channel having closed ends;
    d) seating the new bathtub liner within the old bathtub;
    e) injecting a flowable silicone having a cure time under twenty-four hours into the channel having closed ends, thereby creating a sealed channel; and
    f) applying a silicone caulk about a perimeter of the new bathtub liner after the flowable silicone has become tacky.

9. The method of claim 8 for creating an impenetrable seal between an old bathtub partially surrounded by walls and a new bathtub liner wherein said step of applying a silicone primer comprises the step of applying the silicone primer to a shelf area and overflow area of the old bathtub and a shelf area, top edges, overflow area, and belly of the new bathtub liner.

10. The method of claim 8 for creating an impenetrable seal between an old bathtub partially surrounded by walls and a new bathtub liner wherein the step of applying a silicone primer further comprises the step of applying the silicone primer to any area where tape is applied to both the old bathtub and new bathtub liner.

11. The method of claim 8 for creating an impenetrable seal between an old bathtub partially surrounded by walls and a new bathtub liner wherein the step of applying a flat tape comprises placing parallel rows of flat tape on a belly of the liner from a front of the liner to a back of the liner.

12. The method of claim 8 for creating an impenetrable seal between an old bathtub partially surrounded by walls and a new bathtub liner wherein the step of applying a material forming a U-ring gasket comprises placing a length of round tape about a perimeter of the old bathtub approximately ¼ inch to ½ inch from the walls surrounding the old bathtub and placing the round tape in contact with the walls by coiling the round tape at least three times and pressing the coiled round tape against the wall at front edges of the old bathtub.

13. The method of claim 8 further comprising the step of applying a plurality of short lengths of silicone caulking between, and perpendicular to, the round tape U-ring and the walls about the old bathtub thereby creating dams which section off the channel having closed ends wherein the step of injecting a flowable silicone includes the step of injecting the flowable silicone into each of the channel's sections.

14. The method of claim 8 further comprising the step of positioning a length of round tape around an overflow opening by coiling the round tape at least three times about the overflow opening.

15. The method of claim 8 further comprising the step of placing a length of round tape on a rail of the old bathtub such that the length of round tape is in contact with the round tape U-ring.

16. The method of claim 8 for creating an impenetrable seal between an old bathtub partially surrounded by walls and a new bathtub liner wherein the step of injecting a flowable silicone comprises the steps of:
   a) combining a volume of 100% silicone fluid, with water in a range of 0.5% to 1.5% by volume;
   b) rapidly mixing said volume of 100% silicone fluid and water such that the water is evenly distributed throughout the 100% silicone fluid;
   c) combining said 100% silicone fluid and water mixture with a volume of an acetoxy based flowable silicone that is equal to said volume of 100% silicone fluid;
   d) thoroughly mixing said 100% silicone fluid and water mixture with the acetoxy based flowable silicone;
   e) injecting the resulting mixture within the channel having closed ends; and
   f) allowing the resulting mixture to cure.

17. The method of claim 8 further comprising the steps of cleaning the old bathtub with acetone and cleaning the new bathtub liner with diluted denatured alcohol prior to the step of applying a silicone primer.

18. The method of claim 8 further comprising the step of sealing a base of the walls about the old bathtub to the old bathtub with silicone caulking prior to the step of applying a silicone primer.

19. The method of claim 8 further comprising the step of applying a plurality of beads of silicone caulk around drain and overflow openings of the old bathtub prior to the step of seating the new bathtub liner.

20. The method of claim 8 further comprising the steps of applying a pressure to the new bathtub liner after seating the liner and installing an overflow plate and new drain prior to the step of injecting a flowable silicone.

21. A method for creating an impenetrable seal between an old bathtub partially surrounded by walls and a new bathtub liner comprising the steps of:
   a) applying a silicone primer to both the old bathtub and underside and sides of the new bathtub liner;
   b) applying a flat tape to the underside of the new bathtub liner;
   c) applying a U-ring shaped silicone caulking having first and second ends about a perimeter of a shelf area of the old bathtub wherein said U-ring shaped silicone caulking is positioned within a range of approximately ¼ inch to ½ inch from the walls surrounding the old bathtub and the ends of the U-ring shaped silicone caulking are in contact with front edges of the walls at a front of the old bathtub thereby forming a channel having closed ends;
   d) seating the new bathtub liner within the old bathtub;
   e) injecting a flowable silicone having a rapid cure time into the channel having closed ends thereby creating a sealed channel; and
   f) applying a silicone caulk about a perimeter of the new bathtub liner after the flowable silicone has become tacky.

22. The method of claim 21 for creating an impenetrable seal between an old bathtub and a new bathtub liner wherein said step of injecting a flowable silicone comprises the steps of:
   a) combining a volume of 100% silicone fluid, with water in a range of 0.5% to 1.5% by volume;
   b) rapidly mixing said volume of 100% silicone fluid and water such that the water is evenly distributed throughout the 100% silicone fluid;
   c) combining said 100% silicone fluid and water mixture with a volume of an acetoxy based flowable silicone that is equal to said volume of 100% silicone fluid;
   d) thoroughly mixing said 100% silicone fluid and water mixture with the acetoxy based flowable silicone;
   e) injecting the resulting mixture within the channel having closed ends; and
   f) allowing the resulting mixture to cure.

* * * * *